United States Patent
Wakatsuki et al.

(10) Patent No.: US 8,350,415 B2
(45) Date of Patent: Jan. 8, 2013

(54) SWITCH CIRCUIT WITH INDUCTIVE LOAD AND CAPACITOR

(75) Inventors: Noboru Wakatsuki, Ishinomaki (JP); Hideaki Deguchi, Kawasaki (JP); Yu Yonezawa, Kawasaki (JP); Naoyuki Mishima, Chigasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/946,957

(22) Filed: Nov. 16, 2010

(65) Prior Publication Data

US 2011/0057519 A1    Mar. 10, 2011

Related U.S. Application Data

(63) Continuation of application No. PCT/JP2008/059749, filed on May 27, 2008.

(51) Int. Cl.
*H01H 31/10* (2006.01)
*H01H 33/59* (2006.01)
*H01H 47/00* (2006.01)
*H01H 85/46* (2006.01)
*H01H 19/14* (2006.01)

(52) U.S. Cl. ....................................................... 307/115
(58) Field of Classification Search .................. 307/101, 307/109, 115, 139
See application file for complete search history.

(56) References Cited

U.S. PATENT DOCUMENTS

| 4,684,867 A | 8/1987 | Miller et al. |
| 5,149,214 A | 9/1992 | Futagawa et al. |
| 2009/0201620 A1* | 8/2009 | Gray et al. ............. 361/159 |

FOREIGN PATENT DOCUMENTS

| JP | 55-3918 | 1/1980 |
| JP | 60-257786 | 12/1985 |
| JP | 2-303852 | 12/1990 |
| JP | 2616713 | 3/1997 |
| JP | 2002-78204 | 3/2002 |
| JP | 2003-284332 | 10/2003 |
| JP | 3634982 | 1/2005 |
| JP | 3735673 | 11/2005 |

OTHER PUBLICATIONS

International Search Report for PCT/JP2008/059749, mailed Sep. 2, 2008.

* cited by examiner

*Primary Examiner* — Carlos Amaya
(74) *Attorney, Agent, or Firm* — Staas & Halsey LLP

(57) ABSTRACT

The present invention is a switch circuit equipped with a first switch connected between another end of an inductive load having a one end connected to a one end of a DC power supply and another end of the DC power supply, a capacitor connected between the another end of the inductive load and the another end of the DC power supply and connected in parallel with the first switch, a second switch that connects the another end of the inductive load and the capacitor, a third switch that connects a one end of the capacitor on an inductive load side to the one end of the inductive load so as to be parallel to the second switch, and a control circuit that turns ON the second switch before the first switch is turned OFF and turns OFF the second switch before the first switch is turned ON after being turned OFF.

13 Claims, 16 Drawing Sheets

US 8,350,415 B2

SWITCH CIRCUIT WITH INDUCTIVE LOAD AND CAPACITOR

CROSS-REFERENCE TO RELATED APPLICATION

This application is a continuation application of PCT/JP2008/059749 filed May 27, 2008.

FIELD

The present invention relates to switch circuits, and more particularly, to a switch circuit connected to an inductive load.

BACKGROUND

A switch circuit that supplies current with an inductive load such as a motor connected to a DC power supply, a choke coil or a transformer is widely used in computers, automobiles, home electrical appliances, and industrial instruments.

A flywheel circuit is known as an art for recovering magnetic energy of a switch circuit that supplies current to an inductive load. FIG. 1 is a diagram of a flywheel circuit. Referring to FIG. 1, a main switch SW1, an inductive load L01, and a resistance R01 such as an equivalent serial resistance of the inductive load are connected in series with a DC power supply. A diode D01 is connected in parallel with the inductive load L01. In the flywheel circuit, current Ion flows during a period when the main switch SW1 is ON. During a period when the main switch SW1 is OFF, current Ioff resulting from magnetic energy stored in the inductive load L01 flows through the diode D01. It is thus possible to recover the magnetic energy stored in the inductive load L01.

Further, in Patent Documents 1 through 3, there are disclosed, as methods for recovering magnetic energy when the current that flows in the inductive load is cut off, a method that utilizes resonance of coil and capacitor, or a method for forming four switch circuits in a bridge.

Patent Document 1: Japanese Patent No. 2616713
Patent Document 2: Japanese Patent No. 3634982
Patent Document 3: Japanese Patent No. 3735673

SUMMARY

However, in the flywheel circuit and the arts disclosed in Patent Documents 1 through 3, though the magnetic energy of the inductive load may be recovered, a delay in rising of current due to the inductive load that is caused when the main switch is turned ON may not be suppressed.

The present invention was made in view of the above problem and aims at providing a switch circuit capable of recovering magnetic energy at the time of current cutoff and suppressing delay in rising of current when a main switch is turned ON.

According to an aspect of the present invention, there is provided a switch circuit including: a first switch connected between another end of an inductive load having a one end connected to a one end of a DC power supply and another end of the DC power supply; a capacitor connected between the another end of the inductive load and the another end of the DC power supply and connected in parallel with the first switch; a second switch that connects the another end of the inductive load and the capacitor; a third switch that connects a one end of the capacitor on an inductive load side to the one end of the inductive load so as to be parallel to the second switch; and a control circuit that turns ON the second switch before the first switch is turned OFF and turns OFF the second switch before the first switch is turned ON after being turned OFF.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Now, embodiments of the present invention will be described with reference to the drawings.

Embodiment 1

Figure 1:
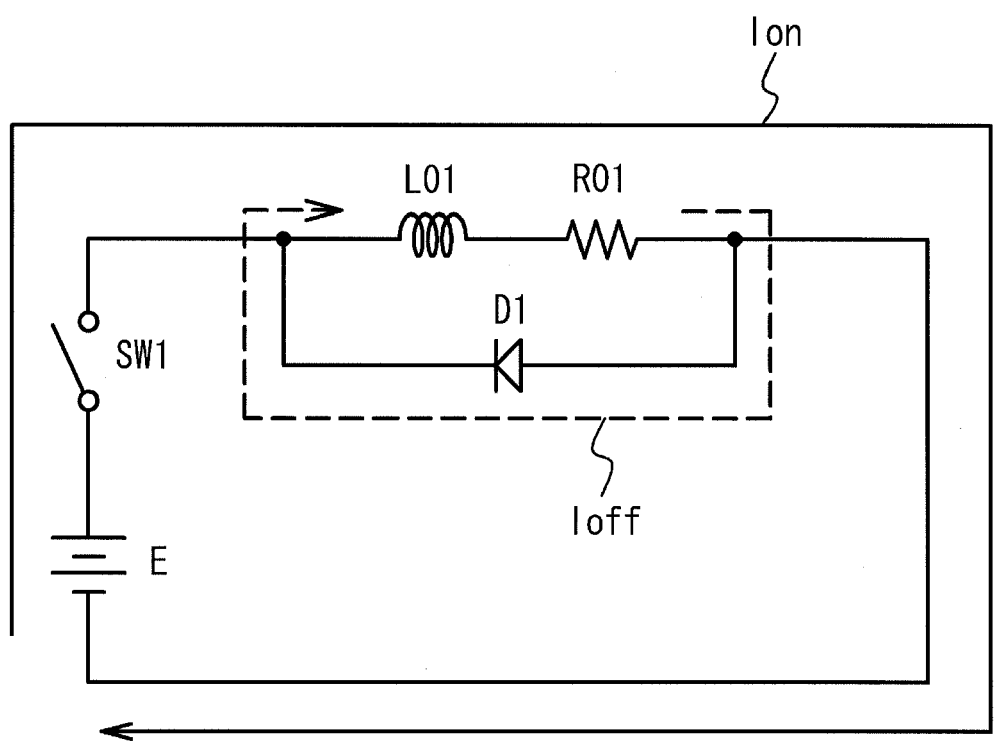
FIG. 1 is a circuit diagram of a flywheel circuit.
Figure 2:
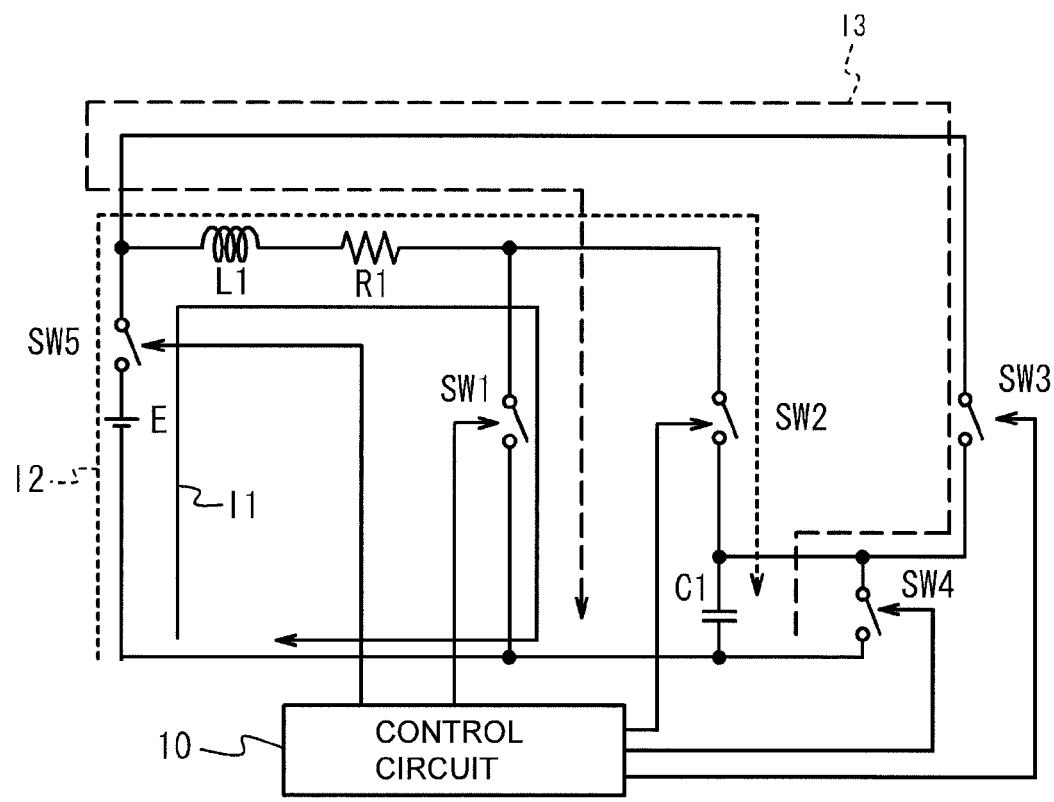
FIG. 2 is a circuit diagram of a switch circuit in accordance with embodiment 1.

FIG. 2 is a circuit diagram of a switch circuit in accordance with embodiment 1. A switch circuit of the embodiment 1 includes a first switch SW1, a second switch SW2, a third switch SW3, a fourth switch SW4, a fifth switch SW5, a DC power supply E, an inductive load L1, a capacitor C1, and a control circuit 10.

A one end of the DC power supply E that is on the positive side and a one end of the inductive load L1 are connected. The first switch SW1 is a main switch and is connected between the one end of the inductive load L1 and the other end of the DC power supply E that is on the negative side. When the first switch SW1 is turned ON, current flows from the DC power supply E to the DC power supply E via the inductive load L1, and when the first switch SW1 is turned OFF, the current is cut off. A resistor R1 connected to the inductive load L1 in series indicates a resistance defined by adding an equivalent series resistance of the inductive load L1 and resistance components along a current I1.

The capacitor C1 is provided between the other end of the inductive load L1 and the other end of the DC power supply E and is connected in parallel with the first switch SW1. When the first switch SW1 is OFF, the capacitor C1 stores the magnetic energy stored in the inductive load L1 in the form of electric energy. That is, the capacitor C1 stores charge. The second switch SW2 is connected between the other end of the inductive load L1 and the capacitor C1, and connects current induced by the magnetic energy in the inductive load L1 to the capacitor C1. The third switch SW3 is connected in parallel with the second switch SW2, and connects the one end of the capacitor C1 on the inductive load L1 side to the one end of the inductive load L1. By the third switch SW3, the charge stored in the capacitor C3 is recovered to the inductive load L1.

The fourth switch SW4, which is a discharge circuit, is connected in parallel with the capacitor C1. When the fourth switch SW4 is turned ON, the charge stored in the capacitor C1 is released. The fifth switch SW5 is connected to the one end of the DC power supply E and the one end of the inductive load L1. The fifth switch SW5 suppresses a reverse flow of the charge from the capacitor C1 to the DC power supply E during the period when the third switch SW3 is ON. The control circuit 10 controls ON/OFF of the first through fifth switches SW1-SW5.

In the switch circuit illustrated in FIG. 2, the inductive load may, for example, be an inductor, an inductive component of a motor or a transformer.

Figure 3:
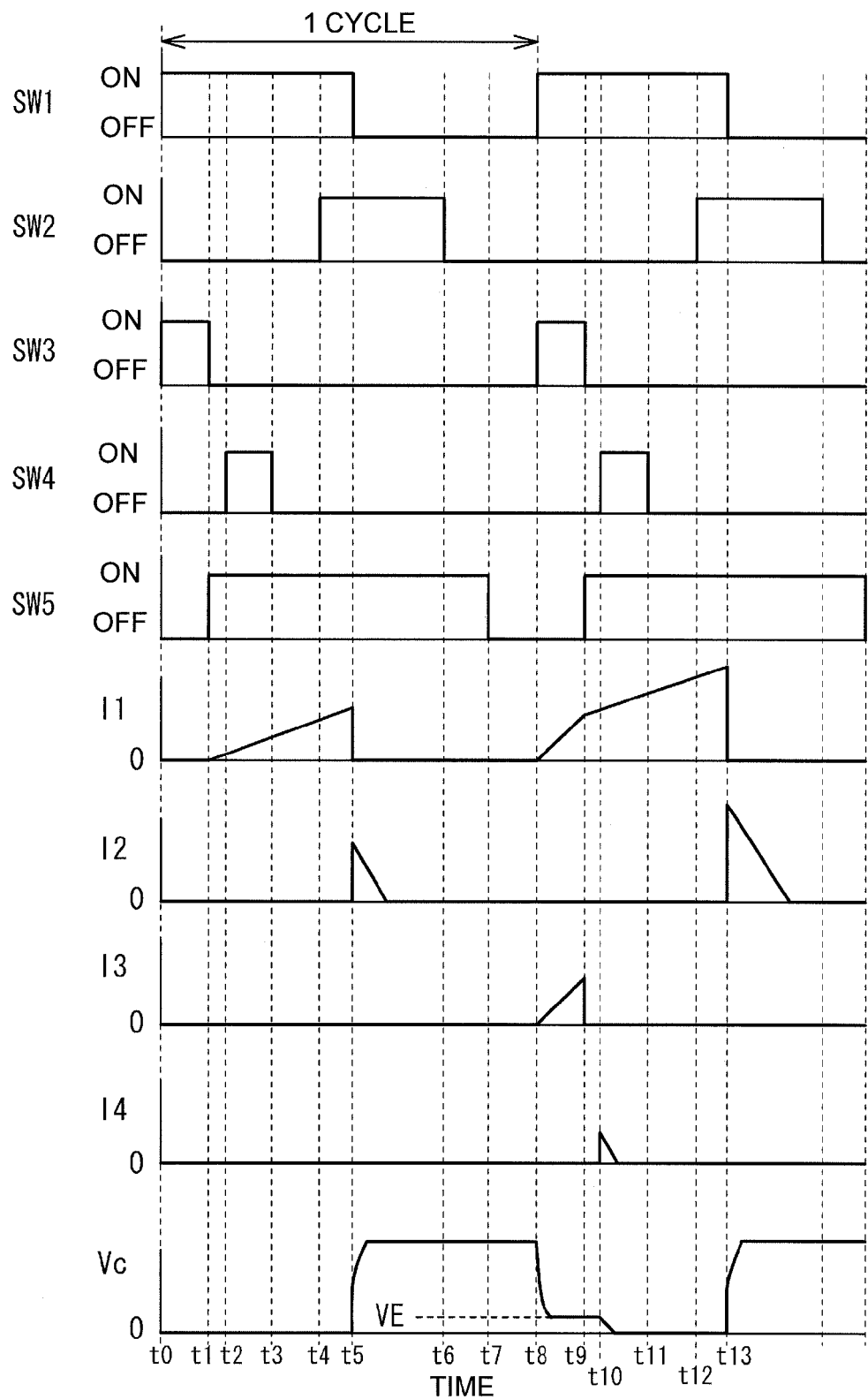
FIG. 3 is a timing chart of the switch circuit in accordance with the embodiment 1.

FIG. 3 is a timing chart of the switch circuit in accordance with the embodiment 1. Just prior to time t0, zeros are current I1 of the first switch SW1, current I2 of the second switch SW2, current I3 of the third switch SW3, current I4 of the fourth switch SW4 and current I5 of the fifth switch SW5. A voltage Vc across the capacitor C1 is zero. The switches SW1~SW5 are OFF.

At time t0, the switch SW1 and the switch SW3 are turned ON. The first switch SW1 connects the other end of the inductive load L1 and the other end of the DC power supply E. However, the current I1 does not flow since the switch SW5 is OFF. The third switch SW3 connects the one end of the capacitor C1 and the one end of the inductive load L1. At this time, the voltage Vc across the capacitor C1 is greater than a power supply voltage VE, so that a high voltage may be applied to the inductive load L1.

At time t1, the fifth switch SW5 is turned ON, and current flows to the inductive load L1 from the DC power supply E so that the current I1 increases gradually. At time t2, the fourth switch SW4 is turned ON. At time t3, the fourth switch SW4 is turned OFF. Although the second switch SW2 is turned ON at time t4, the current I2 hardly flows during the period when the first switch SW1 is ON. At time t5, the first switch SW1 is turned OFF and current induced by the inductive load L1 flows to the capacitor C1 via the second switch SW2 as the current I2, so that the charge may be stored in the capacitor C1. Thus, the capacitor voltage Vc is increased. When the magnetic energy stored in the inductive load L1 is lost, the current I2 becomes zero and the voltage Vc becomes constant. At that time, the voltage across the capacitor C1 is greater than the voltage VE of the DC power supply E. Then, at time t6, the second switch SW2 is turned OFF. At time t7, the fifth switch SW5 is turned OFF.

The period from time t0 to time t8 forms one cycle of switching. Switching that is the same as the switching that starts at time t0 starts at time t8. At time t8, the first switch SW1 and the third switch SW3 are turned ON. Since the charge has been stored in the capacitor C1, the current I3 flows. Since the fifth switch SW5 is OFF, the current I3 is the current I1. At that time, the voltage Vc across the capacitor C1 is greater than the power supply voltage VE, so that a high voltage may be applied to the inductive load L1. Since the charge in the capacitor C1 is released, the voltage Vc of the capacitor C1 decreases and becomes equal to the power supply voltage VE. At time t9, the third switch SW3 is turned OFF, and the current I3 is cut off. The fifth switch SW5 is turned ON and the current I1 flows to the inductive load L1 from the DC power supply E and increases. At time t10, the fourth switch SW4 is turned ON, and the charge in the capacitor C1 is released to result in the current I4, so that the voltage Vc becomes zero. At time t11, the fourth switch SW4 is turned OFF. At time t12, the second switch SW2 is turned ON. At time t13, the first switch SW1 is turned OFF.

According to the embodiment 1, the second switch SW2 is turned ON before the first switch SW1 is turned OFF, and is then turned OFF before the first switch is turned ON. Thus, the charge stored in the capacitor C1 is supplied to the end of the inductive load L1 via the third switch SW3. Thus, the magnetic energy at the time when the first switch SW1 is OFF may be recovered.

The control circuit 10 turns OFF the third switch SW3 before turning OFF the first switch SW1.

The fourth switch SW4 releases the charge stored in the capacitor C1 during the period when the second switch SW2 and the third switch SW3 are OFF. Thus, the charge stored in the capacitor C1 as much as the voltage VE of the DC power supply E may be discharged. The discharge circuit may be formed by a resistor other than the switch.

Figure 4:
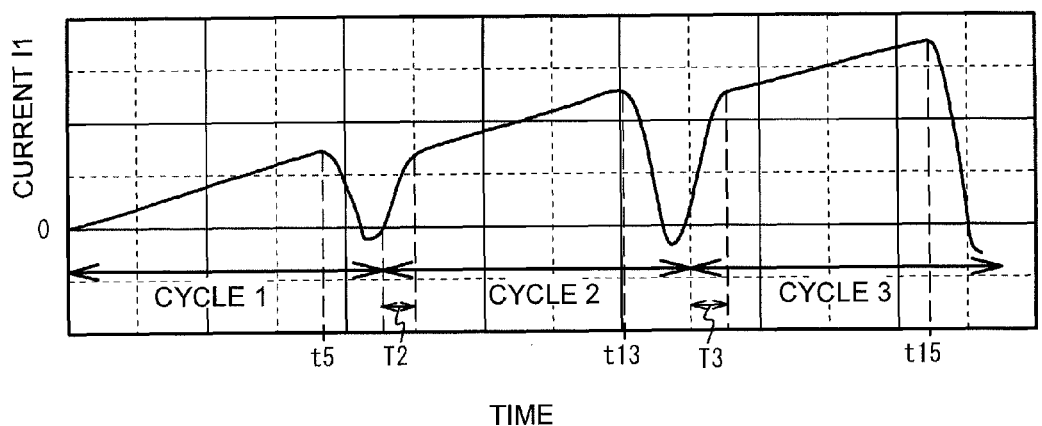
FIG. 4 is a timing chart of a current that flows through a first switch.

FIG. 4 is a timing chart of the current I1 flowing in the first switch SW1 during three cycles. The current I1 that respectively flow at times t5, t13 and t15 when the first switch SW1 is turned OFF increases gradually as the number of cycles increases. This is because the chare stored in the capacitor C1 is recovered by the inductive load L1. Particularly, like the capacitor voltage Vc in FIG. 3, the voltage across the capacitor C1 becomes greater than the power supply voltage VE. During the period between t8 and t9, the voltage applied to the inductive load L1 increases, and the slope of increase in current increases as in the case of the current I1. As the number of cycles increases, the charge stored in the capacitor C1 increases. Thus, as periods T2 and T3 in FIG. 4, as the number of cycles increases, the initial current increasing ratio when the first switch SW1 is turned ON increases. That is, it is possible to cause the current I1 to rise quickly when the first switch SW1 is turned ON. Thus, high-speed switching of the switch circuit may be realized.

The condition for causing the voltage Vc across the capacitor C1 to be greater than the power supply voltage VE is now described. A circuit equation is described as expression 1:

$$L1\frac{di}{dt} + \frac{1}{C1}\int_0^t i\,dt + R1\,i = E \qquad \text{[Expression 1]}$$

where i is the current that flows in the inductive load L1 after the first switch SW1 is turned OFF, L1 is the inductance of the inductive load L1, C1 is the capacitance of the capacitor C1, R1 is the resistance of the resistor R1, E is the voltage of the DC power supply, and t is the time.

It is assumed that the time when the first switch SW1 is turned OFF (time t5 in FIG. 3) is t=0. The capacitor voltage Vc is obtained from expression 1 as indicated by expressions 2~4 in which current i at time t=0 is E/R and the charge q in the capacitor C1 is zero:

$$R1^2 > (4 \times L1)/C1 \quad \text{Condition A}$$

$$Vc = E\left[1 + \varepsilon^{-\alpha \cdot t}\left\{\left(\frac{\frac{1}{R1 \cdot C1} - \alpha}{\beta}\right)\sinh\beta \cdot t - \cosh\beta \cdot t\right\}\right] \quad \text{[Expression 2]}$$

$$R1^2 = (4 \times L1)/C1 \quad \text{Condition B}$$

$$Vc = E\left[1 + \left\{\left(\frac{1}{R1 \cdot C1} - \alpha\right)t - 1\right\}\varepsilon^{-\alpha \cdot t}\right] \quad \text{[Expression 3]}$$

$$R1^2 < (4 \times L1)/C1 \quad \text{Condition C}$$

$$Vc = E\left\{1 + \varepsilon^{-\alpha \cdot t}\left(\frac{\frac{1}{R1 \cdot C1} - \alpha}{\gamma}\sin\gamma \cdot t - \cos\gamma \cdot t\right)\right\}$$

where $\alpha = R1/(2 \times L1)$, $\beta = \sqrt{\{R1/(2 \times L1)^2 - 1/(L1 \times C1)\}}$, $\gamma = \sqrt{\{1/(L1 \times C1) - (R1/(2 \times L1))^2\}}$.

Figure 5:
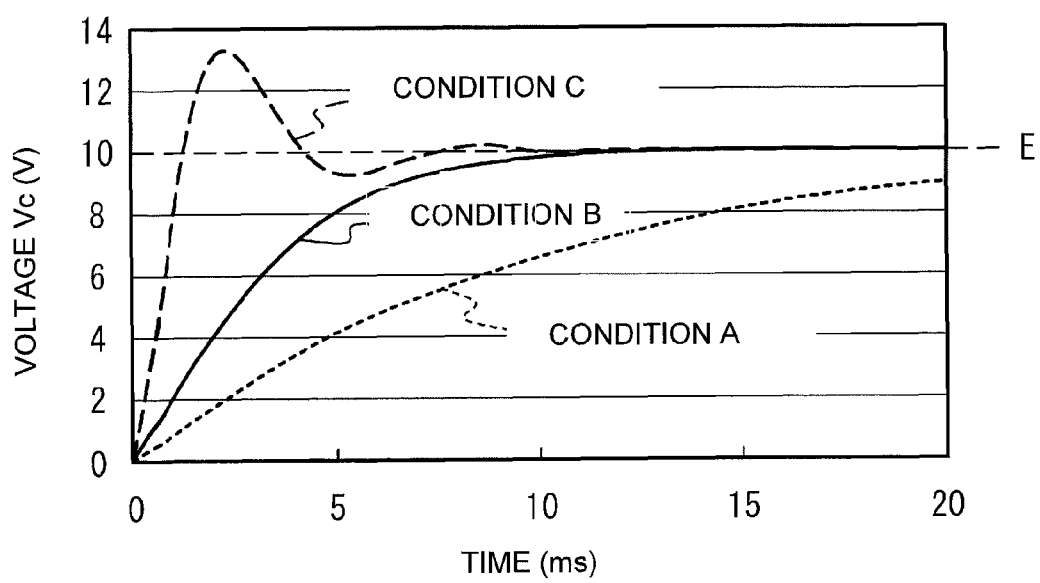
FIG. 5 is a diagram that illustrates examples of equations 2 through 4.

FIG. 5 is a diagram that illustrates examples of expressions 2~4. It is assumed that L1=100 nH, R1=0.1Ω, E=10 V, C1=10 μF for condition A, C1=4 μF for condition B and C1=1 μF for condition C. Referring to FIG. 5, the voltage Vc does not exceed the DC power supply voltage E for conditions A and B. In contrast, the voltage Vc exceeds the DC power supply voltage E for condition C.

From the above, it is preferable that the capacitance C1 of the capacitor C1 has a vale that causes the voltage Vc across the capacitor C1 to be greater than the voltage of the DC power supply. That is, it is preferable that $R1^2 < (4 \times L1)/C1$.

A description is now given of the reason why the embodiment 1 is capable of suppressing power consumption by the resistor R1. The first switch SW1, the inductive load L1, the resistor R1 and the DC power supply E of the first embodiment are simplified as an R-L circuit illustrated in FIG. 6. Assuming that the time t when the first switch SW1 is turned ON is t=0, the time dependence of current i is as illustrated in FIG. 7. The current i is equal to $(1-\varepsilon^{\{(-R1 \times t)L1\}})$, and the time derivative of the current i at time τ is E/R1. As time goes on, the current i becomes close to I=R/R1. The time constant τ is the time t when the current i is equal to $(1-1/\varepsilon) \times I$.

Figure 6:
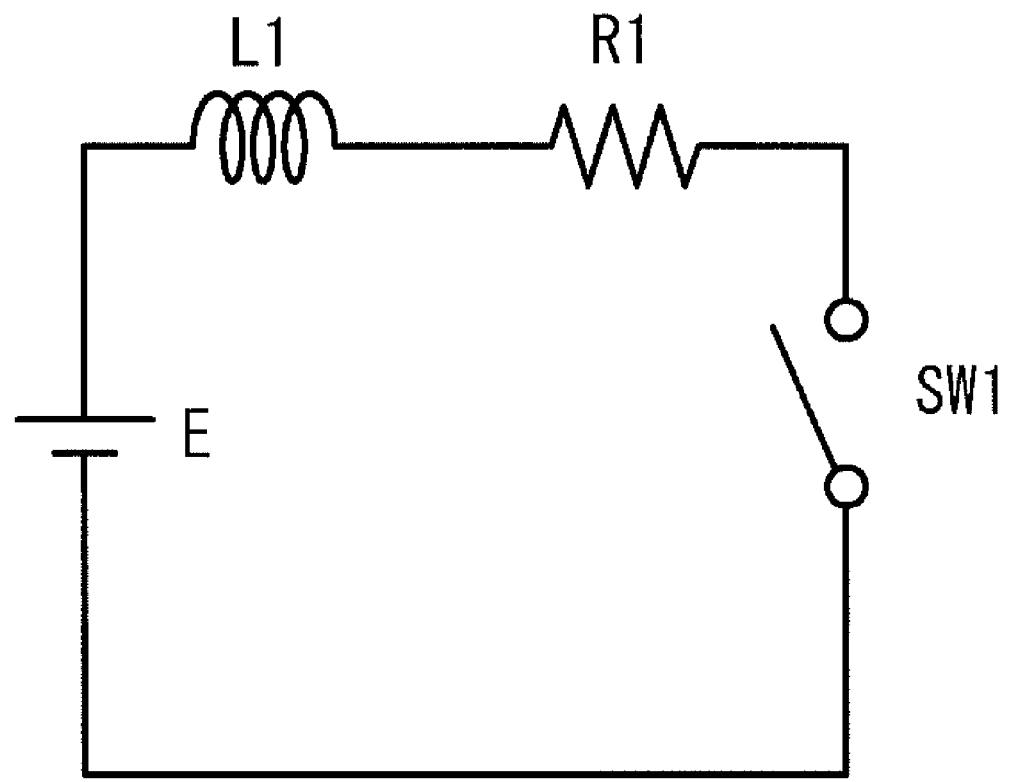
FIG. 6 is a circuit diagram of an R-L series circuit.
Figure 7:
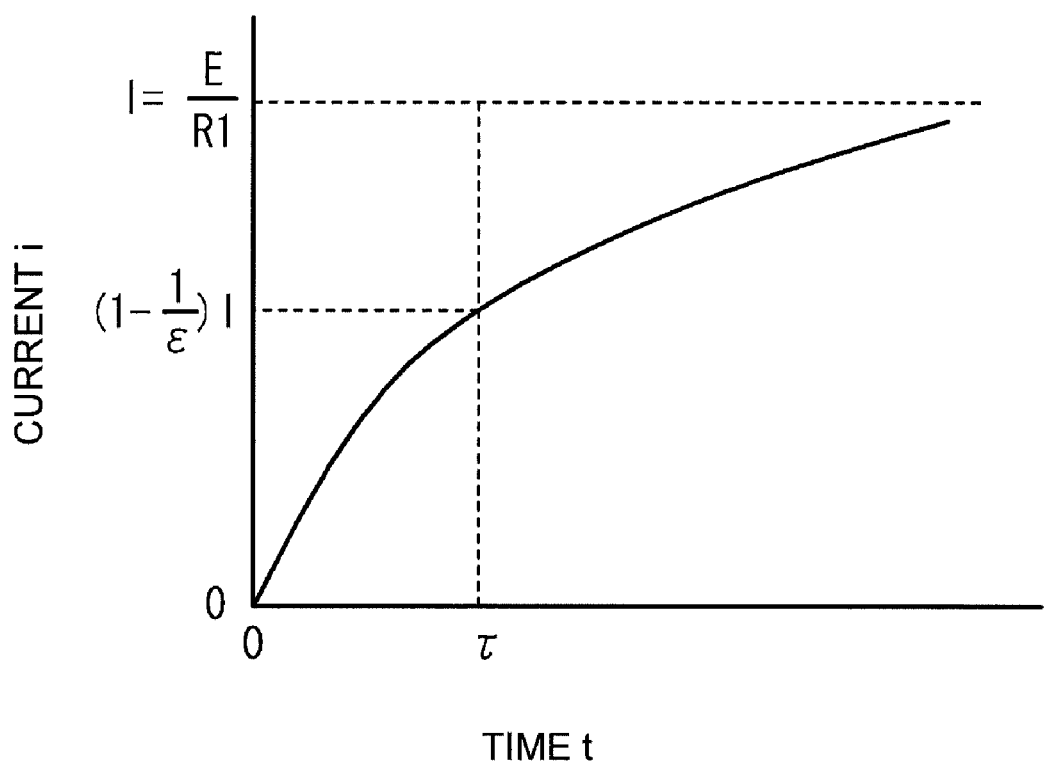
FIG. 7 is a diagram that illustrates current in the circuit in FIG. 6 with regard to time.
Figure 8:
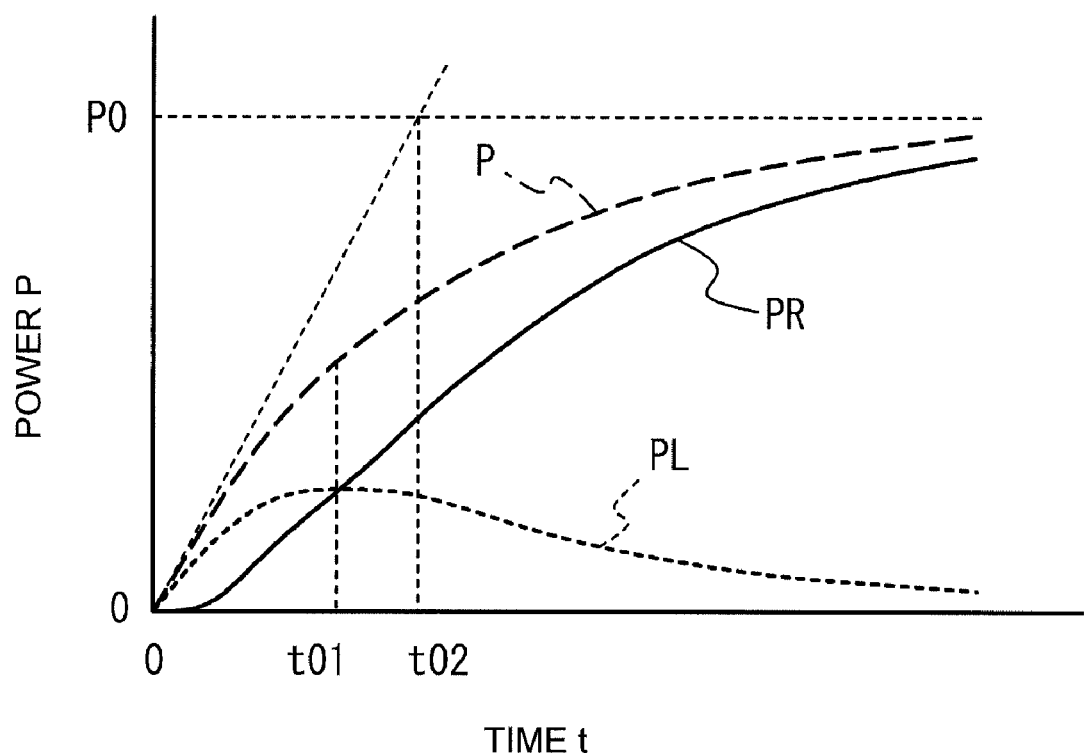
FIG. 8 is a diagram that illustrates consumed power in the circuit in FIG. 6 with regard to time.

FIG. 8 is a graph of consumed power P with respect to the time t in the circuit in FIG. 6. The consumed power P becomes gradually close to saturated consumed power P0 as the time goes on. It is noted that the saturated consumed power PO is equal to I×E. The consumed power P is the sum of power PL consumed in the inductive load L1 and power PR consumed in the resistor R1. At time t0, all the consumed power P is due to the inductive load L. That is, the consumed power P is stored in the inductive load L1 in the form of magnetic energy. For infinite time, all the power P is consumed by the resistor R1. Time t02 at which an asymptotic line for=0 crosses P=P0 is equal to L1/R=τ. At time t01 that is less than time t02, PR and PL become equal to each other.

ACCORDING TO THE EMBODIMENT 1, THE VOLTAGE VC GREATER THAN THE VOLTAGE E OF THE DC POWER SUPPLY IS APPLIED TO THE INDUCTIVE LOAD L1 DURING THE PERIOD BETWEEN TIME T8 AND TIME T9, SO THAT LARGE CURRENT MAY BE INDUCED TO THE INDUCTIVE LOAD L1 BY A TIME SHORTER THAN THE TIME CONSTANT T AND POWER CONSUMPTION BY THE RESISTOR R1 MAY BE REDUCED.

Figure 9:
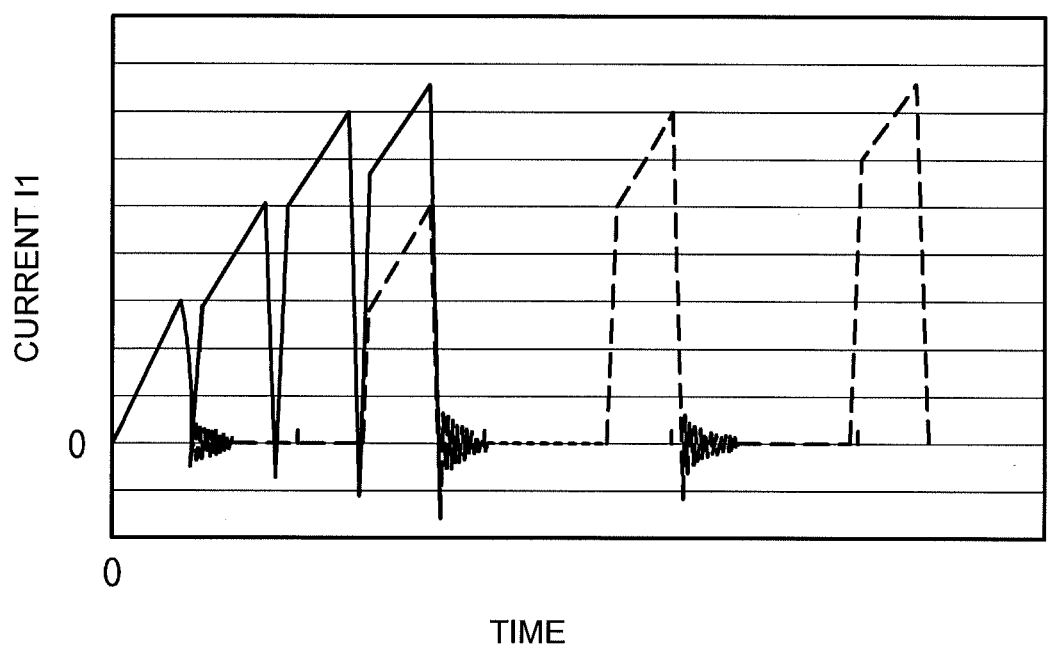
FIG. 9 illustrates a current in a case where a period of t6-t8 in FIG. 3 is shortened (solid line) and another current in a case where the period is lengthened (broken line).

FIG. 9 illustrates the current I1 (solid line) obtained by reducing the period between time t6 and time t8 and the current I1 (broken line) obtained by enlarging the period between time t6 and time t8. The height of the current I1 is constant even by changing the period between time t6 and time t8 and changing the switching frequency. According to the embodiment 1, the magnetic energy is converted to the electric energy, which is then stored in the capacitor C1, so that the identical current I1 may be ensured even by changing the switching frequency.

Embodiment 2

Figure 10:
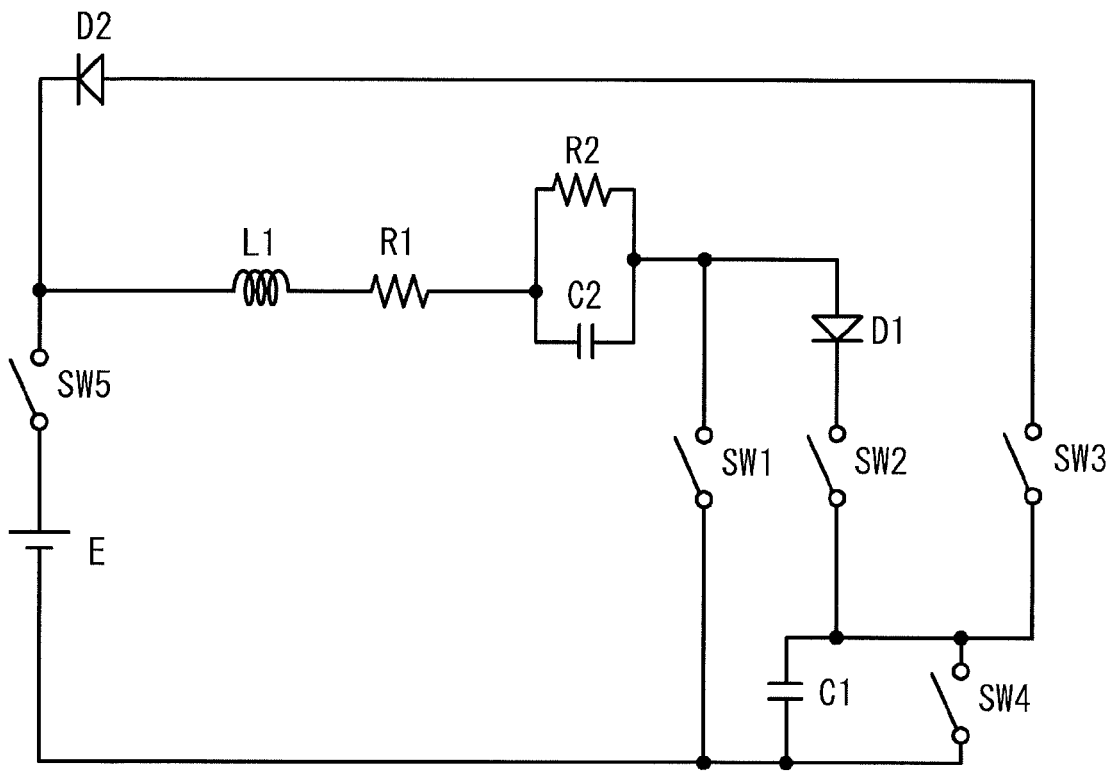
FIG. 10 is a circuit diagram of a switch circuit in accordance with embodiment 2.

FIG. 10 is a circuit diagram of a switch circuit in accordance with embodiment 2. Referring to FIG. 10, a switch circuit of the embodiment 2 is equipped with a resistor R2, a capacitor C2, and diodes D1 and D2 in addition to FIG. 2 of the embodiment 1. The resistor R2 and the capacitor C2 are connected in parallel with each other, and are connected in series with the inductive load L1. The resistor R2 is a load, and the capacitor C2 is a smoothing capacitor. The diode D1 is connected in series with the second switch SW2, and functions as a sixth switch that suppresses a reverse flow of the charge stored in the capacitor. C1 to the inductive load L1 during a period when the second switch SW2 is ON. The diode D2 is connected in series with the third switch SW3, and functions a seventh switch that suppresses a reverse flow of the charge from the DC power supply E to the capacitor C1 during a period when the third switch SW3 is ON. The diodes D1 and D2 may be formed by switches.

Embodiment 3

Figure 11:
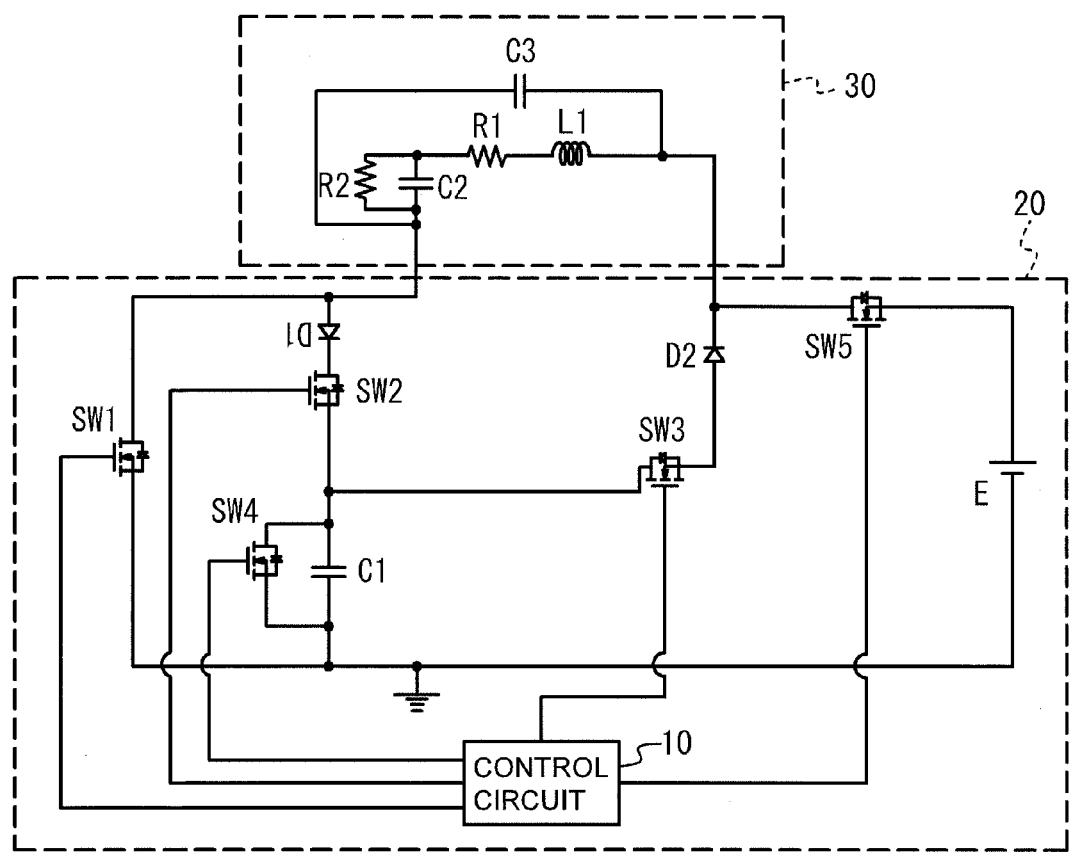
FIG. 11 is a diagram that illustrates an equivalent circuit of a switch circuit and a motor load circuit in accordance with a third embodiment.

Embodiment 3 is an example in which the switch circuit of the embodiment 2 is applied to a DC brush motor. FIG. 11 is a diagram of an equivalent circuit of a switch circuit 20 and a motor load circuit 30. Referring to FIG. 11, the equivalent circuit of the motor load circuit 30 has a capacitor C2 in addition to the inductive load L1, the resistors R1 and R2 and the capacitor C2 employed in the embodiment 2 in FIG. 10. The capacitor C3 is a parasitic capacitor connected in parallel with the load. The switch circuit 20 employs MOSFETs (Metal Oxide Semiconductor FETs) as the first through fifth switches SW1-SW5. The MOSFETs have parasitic diodes, and diodes illustrated in the switches SW1-SW5 in FIG. 11 are these parasitic diodes. The other structures are the same as those of the embodiment 2 in FIG. 10. As in the case of the embodiment 3, the switch circuit 20 may be used as a power supply for the motor.

In the switches having the parasitic diodes like MOSFETs, currents flow in the switches in the forward directions of the parasitic diodes even when the switches are OFF. Thus, as illustrated in FIG. 11, the diode D1 is connected in series with the second switch SW2 and in the direction opposite to the parasitic diode. It is thus possible to restrain the charge due to the forward current of the parasitic diode from being released.

Embodiment 4

Now, two problems of the embodiment 3 are described. The first problem is an increase in power consumption of the first switch SW1 due to the equivalent resistor and the equivalent inductor of the capacitor C1. The second problem is an increase in power consumption in a case where the ON period of the first switch SW1 and so on.

Figure 12:
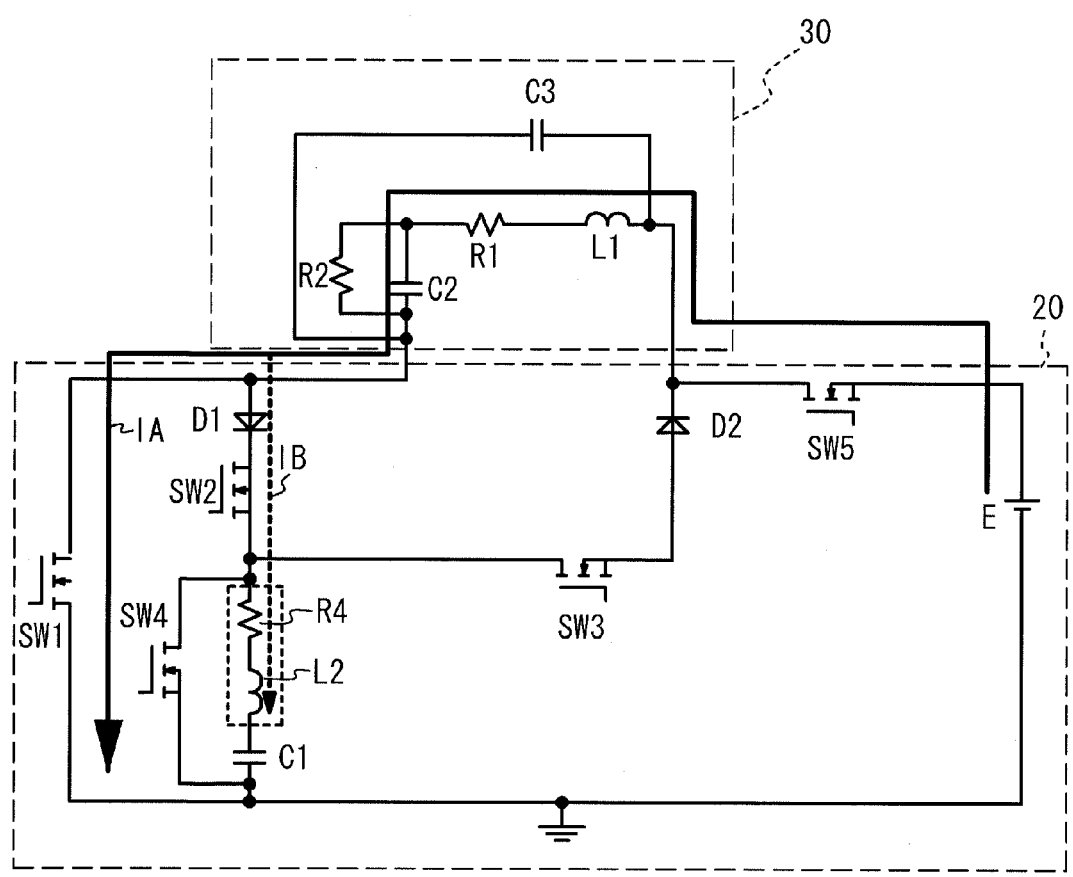
FIG. 12 is a circuit diagram in which an equivalent series resistance and an equivalent series inductance are added to the circuit diagram of the embodiment 3.

First, the first problem is described. FIG. 12 is a circuit diagram in which an equivalent series inductor L2 and an equivalent series resistor R4 of the capacitor C1 are added. The control circuit is not illustrated. Referring to FIG. 12, the capacitor C1 of the embodiment 3 has a function of suppressing an increase in the voltage $V_{SW1}$ across the first switch SW1 at the moment of turning OFF the first switch SW1 and another function of storing and recovering the magnetic energy of the inductive load L1 in the form of charge. The capacitor C1 may have a small capacitance value when it is intended only to suppress increase in the voltage $V_{SW1}$ across the first switch SW1. However, in order to store the magnetic energy of the inductive load L1 in the form of charge, it is preferable that the capacitor C1 has a large capacitance value. With the above in mind, in a case where the capacitor C1 is formed by an electrolytic capacitor having a large capacitance value, the wiring length increases and the equivalent series inductor L2 and the equivalent series resistor R4 are added.

Figure 13:
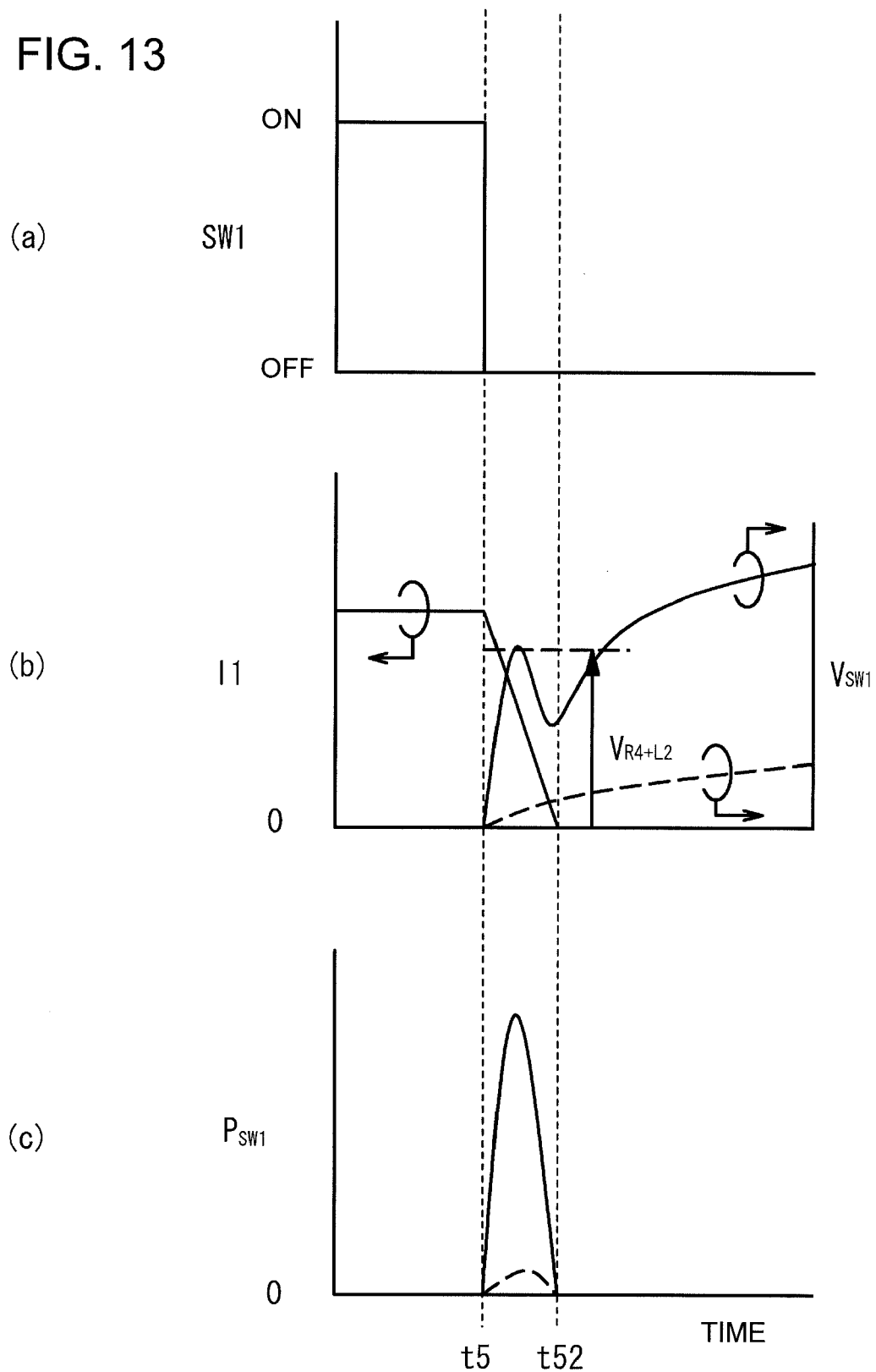
FIG. 13 having parts (a) through (c) is a diagram that describes a first problem in the embodiment 3.

A part (a) of FIG. 13 illustrates ON/OFF of the first switch SW1 in FIG. 12, a part (b) of FIG. 13 illustrates the current I1 that flows in the first switch SW1 and the voltage $V_{SW1}$ across the first switch SW1, and a part (c) of FIG. 13 illustrates power $P_{SW1}$ consumed in the first switch SW1 with respect to time. Broken lines in the pats (b) and (c) of FIG. 13 indicate the voltage $V_{SW1}$ and the power $P_{SW1}$ observed in a case where the inductor L2 and the resistor R4 are ignored, respectively. Referring to the parts (a) and (b) of FIG. 13, while the first switch SW1 is ON, the current I1 flows through a current path IA in FIG. 12. When the first switch SW1 is turned OFF at time t5, the current I1 decreases and becomes zero at time t52. The current path is switched to a current path IB from the current path IA in FIG. 12. At that time, a voltage $V_{R4}$ equal to R4×IB develops across the resistor R4. A voltage $V_{L2}$ equal to −L2×ΔIB/αt develops across the inductor L2. Now, L2 is the inductance of the inductor L2, R4 is the resistance value of the resistor R4, and IB is the value of the current that flows through the inductor L2 and the resistor R4. A voltage $V_{R4}$+$V_{L2}$ is applied across the first switch SW.

Referring to the part (b) of FIG. 13, in a case where the inductor L2 and the resistor R4 are negligible, the voltage $V_{SW1}$ gradually increases as of time t5. In contrast, in a case where the inductor L2 and the resistor R4 are not negligible, the voltage $V_{SW1}$ has the maximal value between time t5 and time t52. Thus, referring to the part (c) of FIG. 13, the consumed power $P_{SW1}$ increases in the case where the inductor L2 and the resistor R4 are not negligible.

Figure 14:
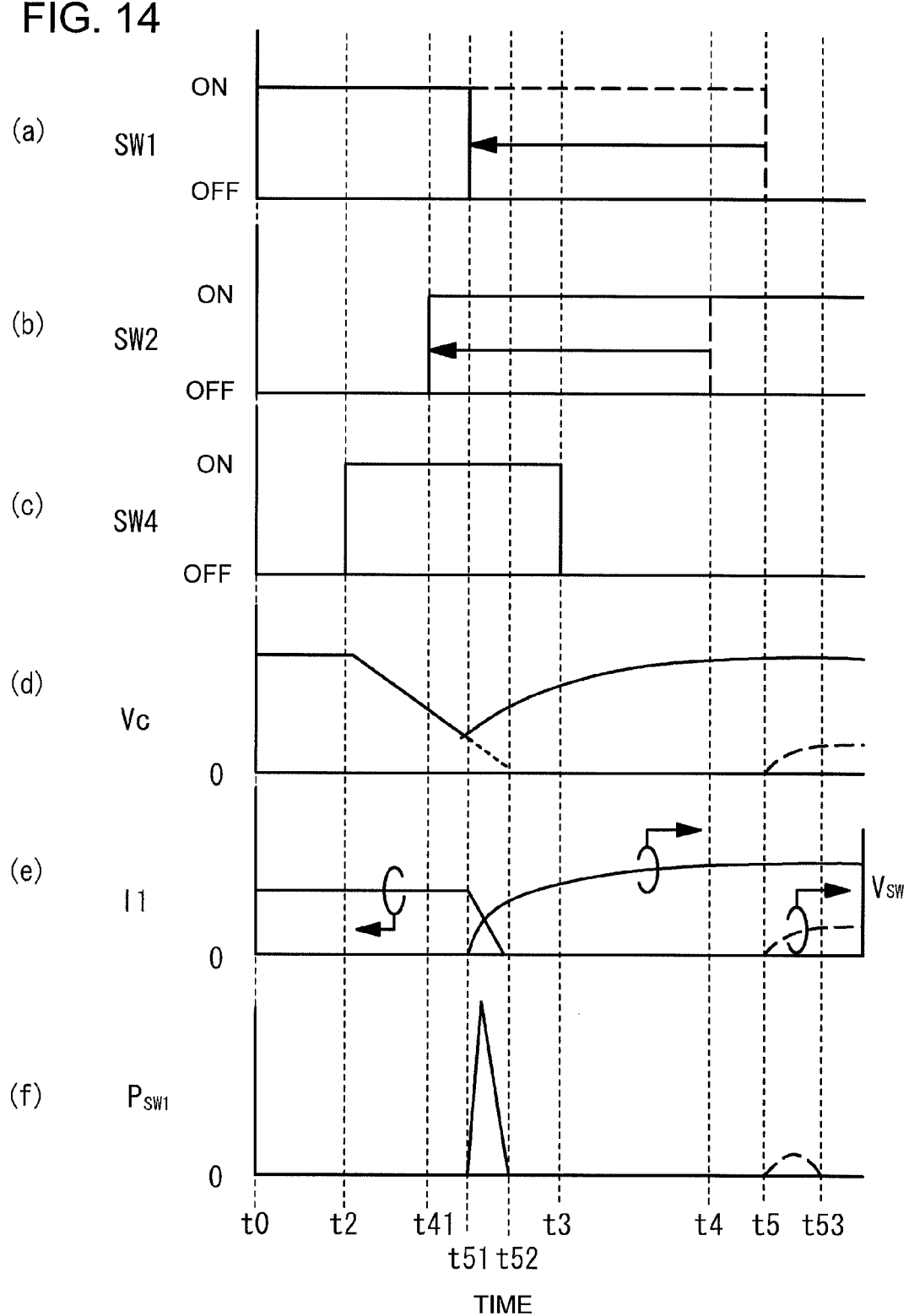
FIG. 14 having parts (a) through (f) is a diagram that describes a second problem in the embodiment 3.

Next, the second problem is described. Parts (a) through (c) of FIG. 14 are timing charts of the first switch SW1, the second switch SW2 and the fourth switch SW4, respectively. Parts (d) through (f) of FIG. 14 are timing charts of the voltage Vc across the capacitor C1, the current I1 and the voltage $V_{SW1}$ of the first switch SW1, and the consumed power $P_{SW1}$ of the first switch SW1, respectively. Referring to the parts (a) through (c) of FIG. 14, in the embodiment 3, normally, the first switch SW1 is turned OFF at time t5 after time t3 when the fourth switch SW4 is turned OFF, and the second switch SW2 is turned ON a time t4 after time t3 (see the broken lines). However, when the load varies, the control circuit shortens the ON/OFF cycle, and may turn OFF and ON the first switch SW1 and the second switch SW2 at times t51 and t41 prior to time t3, respectively (see solid lines).

Referring to the part (d) of FIG. 14, in a case where the first switch SW1 is turned OFF at time t5 and the second switch SW2 is turned ON at time t4, the voltage Vc is zero at time t5 and increases gradually as of time t5 (see the broken lines). In a case where the first switch SW1 is turned OFF at time t51 and the second switch SW2 is turned ON at time t41, the voltage Vc does not become zero at time t51 but increases gradually as of time t51 (see the solid line).

Referring to part (e) of FIG. 14, in a case where the first switch SW1 is turned OFF at time t5 and the second switch SW2 is turned ON at time t4, the voltage $V_{SW1}$ is zero at time t5, and increases gradually as of time t5 (see the broken line). The current I1 becomes zero at time t53 (not illustrated). Thus, as illustrated in part (1) of FIG. 14, the consumed power $P_{SW1}$ develops between time t5 and time t53. In contrast, in a case where the first switch SW1 is turned OFF at time t51 and the second switch SW2 is turned ON at time t41, the voltage $V_{SW1}$ increases abruptly as of time t51 due to the influence of the voltage Vc (see the corresponding solid line). The current I1 decreases as of time t51 and becomes zero at time t52 (see the corresponding solid line). Thus, as illustrated in part (f) of FIG. 14, the consumed power $P_{SW1}$ between time t51 and time t52 is greater than that of the broken line (see the solid line).

As described above, when the capacitor C1 discharges slowly, the charge of the capacitor C1 starts before the discharge of the capacitor C1 is complete in a case where the ON period of the first switch SW1 becomes shorter, and the consumed power PSW1 increases.

In order to suppress the consumed power PSW1, the capacitor C1 may be discharged quickly during the period when the fourth switch SW4 is ON. That is, the capacitance value of the capacitor C1 may be reduced. However, reduction in the capacitance of the capacitor C1 makes it difficult to sufficiently store the magnetic energy of the inductive load L1 in the form of charge and reduces the recovery efficiency. Embodiment 4 solves the above two problems.

Figure 15:
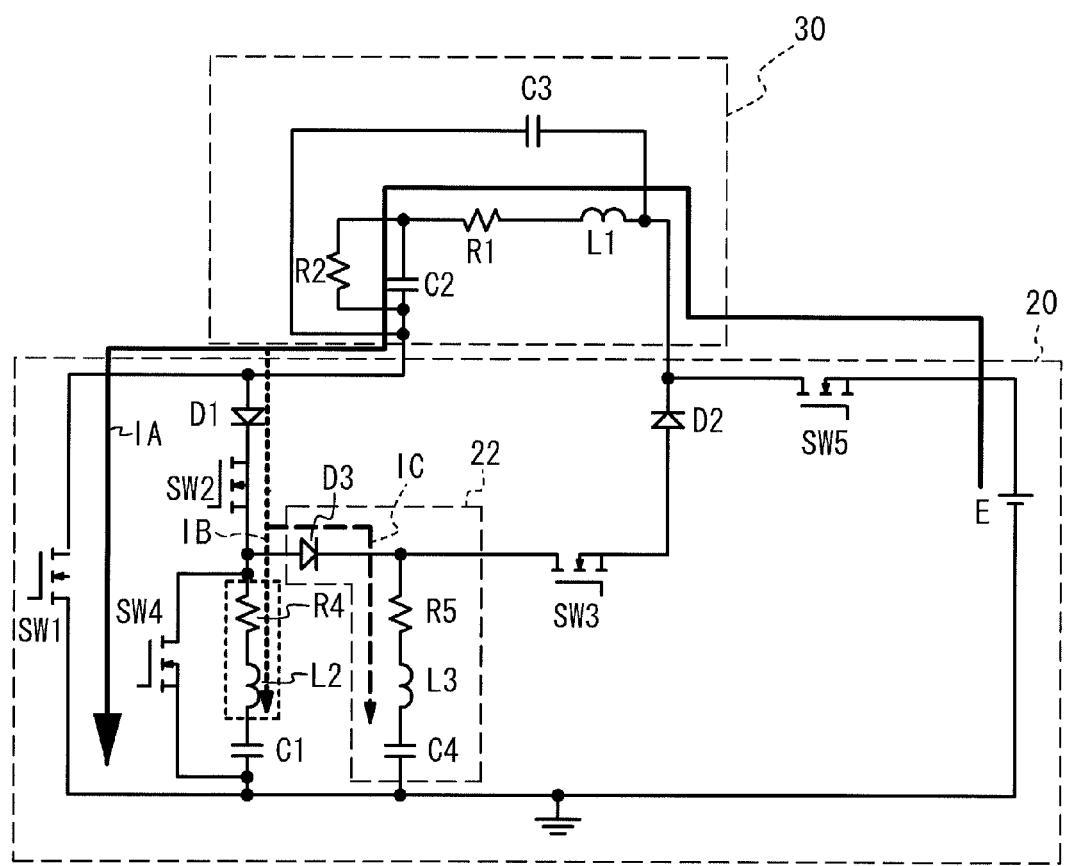
FIG. 15 is a diagram (part 1) that illustrates an equivalent circuit of a switch circuit and a current path in accordance with embodiment 4.

FIG. 15 is a circuit diagram of a switch circuit in accordance with the embodiment 4. Referring to FIG. 15, the switch circuit has a circuit 22 in addition to the embodiment 3 in FIG. 12. The circuit 22 is composed of another capacitor C4 connected in parallel with the capacitor C1, and a diode D3 connected between the capacitor C1 and another capacitor C4. A resistor R5 and an inductor L3 in FIG. 15 are an equivalent series resistor and an equivalent series inductor of the capacitor C4, respectively.

The capacitor C1 may have a capacitance value which makes it possible to suppress the voltage VSW1 across the first switch SW1 to a small value during the time when the first switch SW1 is OFF. The resistor R4 and the inductor L2 have values as small as possible. The capacitor C4 has a capacitance value that makes it possible to absorb the magnetic energy of the inductive load L1.

As described above, the embodiment 4 separates the two functions of the capacitor C1 to the capacitors C1 and C4, respectively. That is, the capacitor C1 is assigned the function of suppressing increase in the voltage $V_{SW1}$ across the first switch SW1, and the capacitor C4 is assigned the function of suppressing storing and recovering the magnetic energy of the inductive load in the form of charge.

Now, the functions of the capacitors C1 and C4 are described. Referring to FIG. 15, when the first switch SW1 starts to be turned OFF, the current that flows in the inductive load L1 switches from the path IA in which the current flows through the first switch SW1 to the path IB in which the current flows through the second switch SW2. When the voltage Vc across the capacitor C1 exceeds the turn-ON voltage of the diode D3, current flows in a path IC and the capacitor C4 is charged. The capacitor C1 is designed to have a capacitance value that makes it possible for the voltage Vc to exceed the turn-ON voltage of the diode D3 after the first switch is completely turned OFF. It is thus possible to reduce the voltage $V_{SW1}$ across the first switch SW1 and suppress the consumed power $P_{SW1}$.

The capacitor C1 may be small and may be a chip capacitor. The chip capacitor is free of leads employed in the electrolytic capacitor, so that the equivalent series resistor R4 and the equivalent series inductor L2 may be reduced. Thus, the first problem may be solved. Even if the other capacitor C4 has a large equivalent series resistor and a large equivalent series inductor, there is no influence of the equivalent series resistor R5 and the equivalent series inductor L3 even when the capacitor C4 has a large equivalent series resistor and an equivalent series inductor.

Figure 16:
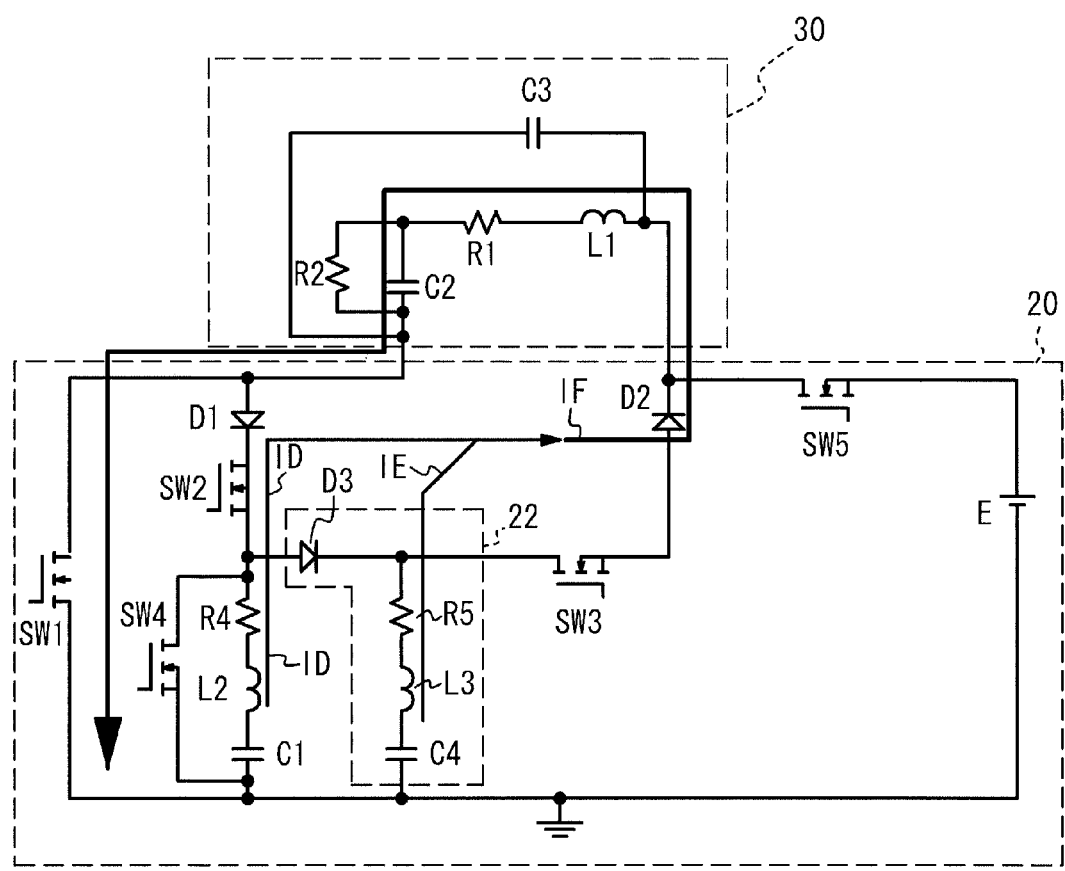
FIG. 16 is a diagram (part 2) that illustrates the equivalent circuit of the switch circuit and the current path in accordance with embodiment 4.

Referring to FIG. 16, when the charges stored in the capacitors C1 and C4 are recovered, the third switch is turned ON, so that current flows through a path IF from paths ID and IE. After that, the fourth switch SW4 is turned ON and the capacitor C1 is discharged. Since the capacitance value of the capacitor C1 may be reduced, as composed to the embodiment 3, loss of the switch SW4 at the time of discharge may be reduced. The charge stored in the capacitor C4 does not flow in the reverse direction due to the presence of the diode D3. Thus, only the capacitor C1 having a small capacitance value may be discharged. Thus, as indicated by the broken line in the part (d) of FIG. 14, the charge time of the capacitor C1 may be reduced. Thus, the second problem may be solved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A switch circuit comprising:
an inductive load, a one end of the inductive load being connected to a one end of a DC power supply;
a first switch connected in series with the inductive load, a one end of the first switch being connected to another end of the inductive load, another end of the first switch being connected to another end of the DC power supply;
a capacitor connected in parallel with the first switch, a one end of the capacitor being connected to a node between the another end of the first switch and the another end of the DC power supply;
a second switch connected in series with the capacitor, a one end of the second switch being connected to a node between the another end of the inductive load and the one end of the first switch, another end of the second switch being connected to another end of the capacitor;
a third switch connected in parallel with the second switch, a one end of the third switch being connected to a node between the another end of the capacitor and the another end of the second switch, another end of the third switch being connected to a node between the one end of the inductive load and the one end of the DC power supply; and
a control circuit that turns ON the second switch before the first switch is turned OFF and turns OFF the second switch before the first switch is turned ON after being turned OFF.

2. The switch circuit according to claim 1, further comprising an inductor that is the inductive load.

3. The switch circuit according to claim 1, wherein the control circuit turns OFF the third switch before turning OFF the first switch.

4. The switch circuit according to claim 1, wherein the capacitor has a capacitance value that enables a voltage across the capacitor to be greater than a voltage of the DC power supply.

5. The switch circuit according to claim 1, further comprising a discharge circuit that releases a charge stored in the capacitor during a period when the second switch and the third switch are OFF.

6. The switch circuit according to claim 1, further comprising a additional switch that is provided in series with the third switch and suppresses a reverse flow of charge from the DC power supply to the capacitor during a period when the third switch is ON.

7. A switch circuit comprising:
an inductive load, a one end of the inductive load being connected to a one end of a DC power supply;
a first switch connected between another end of the inductive load and another end of the DC power supply;
a capacitor connected between the another end of the inductive load and the another end of the DC power supply and connected in parallel with the first switch;
a second switch that connects the another end of the inductive load and the capacitor;
a third switch that connects a one end of the capacitor on an inductive load side to the one end of the inductive load so as to be parallel to the second switch;
a control circuit that turns ON the second switch before the first switch is turned OFF and turns OFF the second switch before the first switch is turned ON after being turned OFF; and
a discharge circuit that releases a charge stored in the capacitor during a period when the second switch and the third switch are OFF,
wherein the discharge circuit is a fourth switch or a resistor connected in parallel with the capacitor.

8. The switch circuit according to claim 1, further comprising an additional switch that is provided between the one end of the DC power supply and the one end of the inductive load and suppresses a reverse flow of charge from the capacitor to the DC power supply during a period when the third switch is ON.

9. The switch circuit according to claim 1, further comprising an additional switch that is provided in series with the second switch and suppresses a reverse flow of charge stored in the capacitor to the inductive load during a period when the second switch is ON.

10. The switch circuit according to claim 9, wherein the second switch has a parasitic diode, and
the additional switch is a diode connected in series with the second switch in an opposite direction to the parasitic diode.

11. The switch circuit according to claim 6, wherein the third switch has a parasitic diode, and
the additional switch is a diode connected in series with the third switch in an opposite direction to the parasitic diode.

12. A switch circuit comprising:
an inductive load, a one end of the inductive load being connected to a one end of a DC power supply;
a first switch connected between another end of the inductive load and another end of the DC power supply;

a capacitor connected between the another end of the inductive load and the another end of the DC power supply and connected in parallel with the first switch;

a second switch that connects the another end of the inductive load and the capacitor;

a third switch that connects a one end of the capacitor on an inductive load side to the one end of the inductive load so as to be parallel to the second switch;

a control circuit that turns ON the second switch before the first switch is turned OFF and turns OFF the second switch before the first switch is turned ON after being turned OFF;

a discharge circuit that releases a charge stored in the capacitor during a period when the second switch and the third switch are OFF;

another capacitor that is connected in parallel with the capacitor and has a capacitance value greater than that of the capacitor; and a fourth switch that suppresses a reverse flow of charge stored in the another capacitor to the capacitor when the charge stored in the capacitor is released.

13. The switch circuit according to claim 12, wherein the capacitor is a chip capacitor.

* * * * *